United States Patent
Park et al.

(10) Patent No.: US 10,649,134 B2
(45) Date of Patent: May 12, 2020

(54) CIRCUIT DEVICE OF EMITTING HEAT AND BACKLIGHT UNIT COMPRISING THEREOF

(71) Applicant: LG DISPLAY CO., LTD., Seoul (KR)

(72) Inventors: Hyunmin Park, Paju-si (KR); SangChul Ryu, Gumi-si (KR); RokHee Lee, Seoul (KR); Suhun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/197,252

(22) Filed: Jun. 29, 2016

(65) Prior Publication Data

US 2016/0377799 A1  Dec. 29, 2016

(30) Foreign Application Priority Data

Jun. 29, 2015 (KR) .................. 10-2015-0091976

(51) Int. Cl.
*F21V 8/00* (2006.01)

(52) U.S. Cl.
CPC ......... *G02B 6/0085* (2013.01); *G02B 6/0068* (2013.01); *G02B 6/0083* (2013.01)

(58) Field of Classification Search
CPC .. G02B 6/0088; G02B 6/0068; G02B 6/0083; G02B 6/0085
USPC ................ 315/312, 112, 151, 294, 113, 152
See application file for complete search history.

(56) References Cited

U.S. PATENT DOCUMENTS

| | | | |
|---|---|---|---|
| 2010/0045190 A1* | 2/2010 | Cramer | H05B 33/0854 315/151 |
| 2012/0212976 A1* | 8/2012 | Chen | G02F 1/133603 362/609 |
| 2013/0162506 A1* | 6/2013 | Kim | G06F 1/32 345/82 |
| 2014/0226080 A1* | 8/2014 | Tomomasa | G02B 6/0085 348/794 |
| 2015/0372207 A1* | 12/2015 | Kim | H01L 33/62 257/98 |
| 2016/0076829 A1* | 3/2016 | Lee | C09J 7/0296 428/41.8 |

FOREIGN PATENT DOCUMENTS

| | | |
|---|---|---|
| CN | 101988995 A | 3/2011 |
| CN | 202581233 U | 12/2012 |
| CN | 103176303 A | 6/2013 |

(Continued)

*Primary Examiner* — Dedei K Hammond
*Assistant Examiner* — Amy X Yang
(74) *Attorney, Agent, or Firm* — Birch, Stewart, Kolasch & Birch, LLP

(57) ABSTRACT

There are provided a circuit device for emitting heat to the outside and a backlight unit including the same. The present invention relates to a display device, a backlight unit connected to a display panel, or a constituent element thereof. The circuit device generates heat, and one or more heat emitting units for emitting heat generated from the light source of the backlight unit to the outside are added to the circuit device, and the backlight unit controlled by the aforementioned circuit device is provided. Each of the heat emitting units according to one embodiment of the present invention includes two or more different material layers to fix the circuit device and provide a heat emitting/directing function.

19 Claims, 16 Drawing Sheets

(56) References Cited

FOREIGN PATENT DOCUMENTS

| | | |
|---|---|---|
| CN | 103592796 A | 2/2014 |
| CN | 103791311 A | 5/2014 |
| CN | 104487763 A | 4/2015 |

* cited by examiner

CIRCUIT DEVICE OF EMITTING HEAT AND BACKLIGHT UNIT COMPRISING THEREOF

CROSS-REFERENCE TO RELATED APPLICATIONS

This application claims priority from Korean Patent Application No. 10-2015-0091976, filed on Jun. 29, 2015, which is hereby incorporated by reference for all purposes as if fully set forth herein.

BACKGROUND OF THE INVENTION

Field of the Invention

The present invention relates to a circuit device for emitting or directing heat to a different area and a backlight unit comprising thereof.

Description of the Related Art

In general, with the development of the information society, requirements for display devices for displaying images have been increased in various forms. Recently, various display devices such as a liquid crystal display (LCD), a plasma display panel (PDP), and an organic light emitting diode display device (OLED) have been utilized.

Among the display devices, the LCD displays an image by adjusting light transmittance of a liquid crystal by using an electric field. To this end, the LCD includes a liquid crystal display panel in which liquid crystal cells are aligned in a matrix form and a driving circuit for driving the liquid crystal display panel.

Further, the LCD receives light through a backlight unit, and in the backlight unit, heat is generated due to light and thus, the generated heat needs to be emitted or directed to the outside.

In order to remove the heat generated in the backlight unit or redirect the generated heat to the outside or to another area, various mechanical heat emitting means (i.e., heat directing means) have been developed, but it is inconvenient to install the heat emitting means and there are many disadvantages due to mechanical features. Further, even in the LCD connected with the backlight unit, the heat is generated, and thus, a structure for emitting various heat generated in the display device to the outside is required. However, when a size of a bezel is increased due to the heat emitting device, the size of the entire display device is increased.

Therefore, a technique of reducing or maintaining the size of the display device while efficiently emitting the heat generated in the display panel to the outside is required.

SUMMARY OF THE INVENTION

An aspect of the present invention provides a circuit device for emitting (directing) heat to the outside.

Another aspect of the present invention provides a backlight unit including the circuit device to emit heat generated in the backlight unit and the circuit device to the outside.

Yet another aspect of the present invention provides a circuit device which is integrally connected with a heat emitting unit to be supported in the backlight unit.

According to an aspect of the present invention, there is provided a circuit device to which a heat emitting unit providing a heat emitting function is connected to emit heat generated from the circuit device controlling a light source unit to the outside.

Further, according to another aspect of the present invention, there is provided a circuit device including a heat emitting unit constituted by two or more different material layers for emitting the heat of the circuit device to be fixed by the heat emitting unit.

According to yet another aspect of the present invention, there is provided a circuit device including a light source unit including a plurality of light sources and an integrated circuit device to which a heat emitting unit providing a heat emitting function to emit heat generated from the circuit device controlling the light source unit to the outside and a backlight unit controlled by the aforementioned circuit device.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
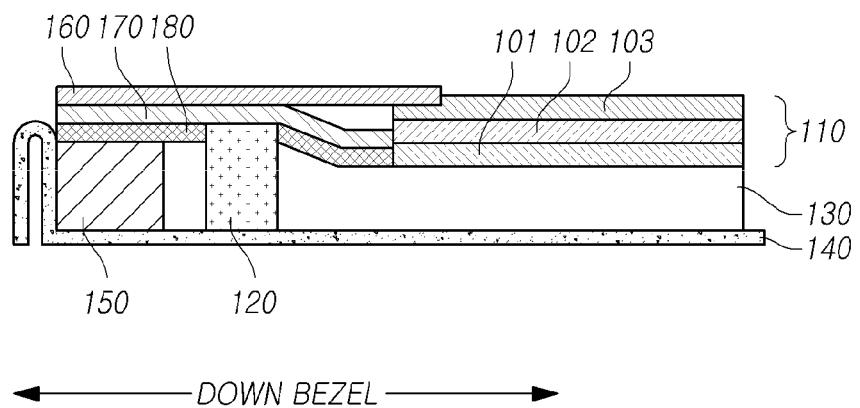
FIG. 1 is a diagram illustrating a configuration of a backlight unit connected to a display panel.

Exemplary embodiments of the present invention will now be described in detail with reference to the accompanying drawings.

As set forth above, according to exemplary embodiments of the invention, according to exemplary embodiments of the invention, it is possible to emit, to the outside, the heat of the backlight unit and the circuit device by the circuit device of emitting the heat. In the present description, heat emitting preferably means emitting and/or redirecting heat to the outside or to another area of preference.

Further, it is possible to enhance a heat emitting effect by configuring a heat emitting unit of the circuit device with two or more layers.

Further, it is possible to support the circuit device in the backlight while enhancing the heat emitting effect by configuring the heat emitting unit of the circuit device with an insulating layer and a metal layer.

Hereinafter, some exemplary embodiments of the present invention will be described in detail with reference to the accompanying drawings. When reference numerals refer to components of each drawing, it is to be noted that although the same components are illustrated in different drawings, the same components are referred to by the same reference numerals as possible. Further, in describing the exemplary embodiment, when it is determined that the detailed description of the known configuration or function related to the present invention may obscure the gist of the present invention, the detailed description thereof will be omitted.

Further, terms such as first, second, A, B, (a), (b), and the like may be used in describing the components of the exemplary embodiments according to the present invention. The terms are used to just distinguish the component from other components and the essence, sequence, or order of the corresponding component is not limited by the terms. When it is disclosed that any component is "connected", "coupled", or "linked" to other components, it should be understood that the component maybe directly connected or linked to other components, but another component may be "connected", "coupled", or "linked" between the respective components.

In a pixel array of the liquid crystal display panel connected with the present invention, a plurality of gate lines GL and data lines DL cross each other and a thin film transistor (hereinafter, referred to as a "TFT") for driving a liquid crystal cell Clc at the cross portion of the gate line GL and the data line DL is formed. Further, on the liquid crystal display panel, a storage capacitor Cst for maintaining voltage of the liquid crystal cell Clc is formed. The liquid crystal cell Clc includes a pixel electrode, a common electrode, and a liquid crystal layer. An electric field is applied to the liquid crystal layer of the liquid crystal cells Clc by data voltage applied to the pixel electrode and common voltage Vcom applied to the common electrode. An image is implemented by adjusting a light amount which passes through the liquid crystal layer by the electric field. The driving circuit includes a gate driving circuit for supplying a gate output signal to the gate lines in sequence and a data driving circuit for driving a video signal (that is, data voltage) to the data lines.

The data driving circuit is also expressed as a D-IC and drives the data lines to supply the data voltage to the liquid crystal cells Clc. The gate driving circuit drives the gate lines in sequence to select the liquid crystal cells Clc of the display panel to be supplied with the data voltage by 1 horizontal line.

The gate driving circuit includes a gate shift register constituted by a plurality of stages so as to generate gate signals in sequence. Each stage of the shift register alternately performs charge and discharge and outputs a gate clock signal CLK and a gate output signal Vout formed at a low-potential voltage Vss level. Output terminals of the stages are connected to the gate lines one to one, respectively. The gate signal at a first level is sequentially generated once in one frame from the stages to be supplied to the corresponding gate line.

Meanwhile, a structure in which the gate driving circuit is directly formed on an array substrate is expressed as a gate-in-panel (GIP) structure and in the GIP structure, a plurality of GIP blocks as circuit blocks for providing the gate output signal Vout to each gate line is directly formed on the panel.

The light passing through the aforementioned liquid crystal cells is generated in the backlight unit connected to the liquid crystal display panel, and the backlight unit is constituted by alight source such as an LED and an OLED and inputs the light emitted by the light source to the liquid crystal display panel through a light guide plate.

FIG. 1 is a diagram illustrating a configuration of a backlight unit connected to a display panel.

As shown in FIG. 1, an optical sheet 110, a light source unit 120, a light guide plate 130, a cover bottom 140, a PCB 170 connected to the light source unit 120 to control the light source unit 120, a double tape supporting the PCB 170, and a light shield tape 160 shielding the light inputted to the PCB are provided. In the case of a connection structure of FIG. 1, particularly, connecting FIG. 1 to the liquid crystal display panel, in order to implement a slim and narrow backlight unit, the PCB may be adhered to a mold unit 150 with the double tape 180. In this structure, there is no configuration for emitting the heat generated from the PCB 170 to the outside. Particularly, in a high-resolution model, the number of installed packages is increased and as a result, the generated heat is increased, while the PCB 170 is narrowed in order to reduce a down bezel.

In order to support the PCB 170 controlling the backlight unit, the mold unit 150 is included, and there is a problem in that the size of the down bezel is increased due to the configuration of the mold unit 150. Particularly, the down bezel is increased by a width of the mold unit 150. Further, a configuration of removing the heat of the PCB 170 from the outside is required.

In this specification, a configuration of reducing the size of the bezel by reducing or removing the mold unit 150 is proposed. Further, in this specification, a configuration of emitting heat generated by increasing the number of packages installed on the PCB 170 will be proposed. For the size of the bezel and the heat emitting, a backlight unit including a heat emitting configuration while reducing or removing the mold unit 150 is proposed. As another exemplary embodiment, the size of the bezel is maintained, and in order to enhance a heat emitting effect, the mold unit 150 is maintained as it is and further, a backlight unit including a heat emitting configuration is proposed.

First, a circuit device connected to the backlight unit will be described. The circuit device uses the aforementioned PCB as an exemplary embodiment and is connected to the light source 120 such as one or more LEDs. The circuit device controls light of the light source unit 120 and receives a control signal to control the light source unit from the outside.

Figure 2:
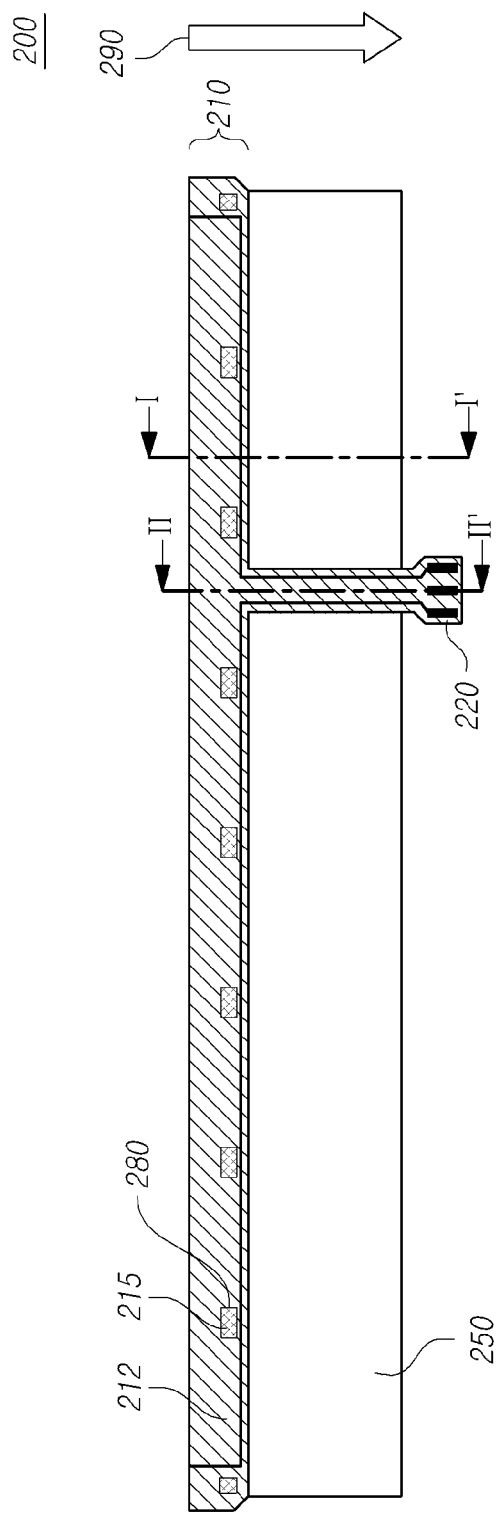
FIG. 2 is a diagram illustrating a configuration of a circuit device connected with a heat emitting unit according to an exemplary embodiment of the present invention.

FIG. 2 is a diagram illustrating a configuration of a circuit device 200 connected with a heat emitting unit according to an exemplary embodiment of the present invention.

As shown in FIG. 2, the circuit device 200 is constituted by a first circuit unit 210, a second circuit unit 220, and a heat emitting unit 250. The first circuit unit 210 is electrically connected to the light source unit 120 of FIG. 1. The second circuit unit 220 receives the control signal that controls the light source unit 120. The second circuit unit 220 may received a signal from a timing controller, a data driver, a gate driver, or the like of the liquid crystal display panel. In the first circuit unit 210, a portion electrically connected to the light source unit 120 is exposed through a hole 280. The first circuit unit 210 is disposed by an insulating layer 212 blocking an electric contact from the outside and a conductive layer 215 disposed with a circuit, and a part of the conductive layer 215 is exposed to be electrically in contact with the light source unit 120 through the hole 280.

The heat emitting unit 250 is connected to one side of the first circuit unit 210 and provides a function of emitting heat of the circuit device 200. The heat emitting unit 250 may be constituted in various forms and in the exemplary embodiment of FIG. 2, the heat emitting unit 250 is integrally connected to a long side of the first circuit unit 210. The heat emitting unit 250 integrally connected to the long side emits the heat of the first circuit unit 210 in a direction of 290. Since the heat emitting unit 250 is connected to the long side, the heat generated from the first circuit unit 210 of the circuit device 200 is transferred to the heat emitting unit 250 to be emitted. In the circuit device 200, I-I' as a cross section of the first circuit unit 210 and the heat emitting unit 250 will be described below.

In FIG. 2, the heat emitting unit 250 may have one or two or more lower constituent elements. For example, the heat emitting unit 250 may be constituted by a multilayer.

In FIG. 2, the heat emitting unit 250 has a form covering the outside of the light source unit to emit the heat to the outside of the backlight unit. This will be described in FIG. 11.

The heat emitting unit 250 proposed in FIG. 2 is connected to the first circuit unit 210 and thus, the first circuit unit 210 emits the heat generated from the first circuit unit 210 itself and the heat generated from the light source unit to the outside of the backlight unit while applying the control signal with the light source unit such as an LED to prevent the first circuit unit 210 and the light source unit from being damaged due to the heat. That is, as illustrated in FIG. 2, the circuit device or the backlight unit including the heat emitting unit 250 moves (or redirects) the heat generated from the light source unit and the circuit unit to normally operate the backlight unit.

Further, in comparison with FIG. 3 to be described below, in the case of integrally forming the heat emitting unit 250 as illustrated in FIG. 2, the heat may move in the heat emitting unit 250. This varies according to whether the first circuit unit 210 emits the heat with any pattern, and when the first circuit unit 210 evenly emits the heat, for example, when the heat is evenly emitted according to an interval between the holes 250 of the first circuit unit 210, the heat emitting unit 250 is integrally formed to facilitate the movement of the heat.

Figure 3:
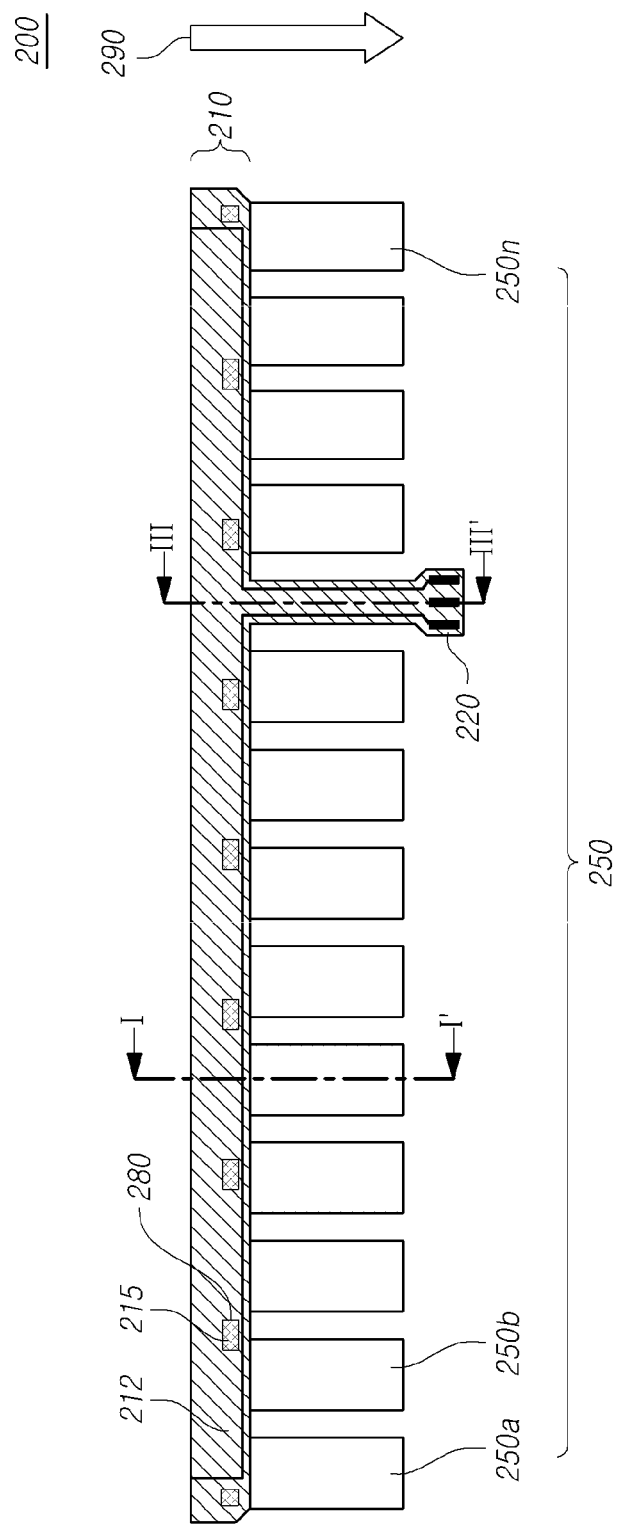
FIG. 3 is a diagram illustrating a configuration of a circuit device connected with a heat emitting unit according to another exemplary embodiment of the present invention.

FIG. 3 is a diagram illustrating a configuration of a circuit device connected with a heat emitting unit according to another exemplary embodiment of the present invention.

FIG. 3 is a structure in which a plurality of heat emitting units is disposed unlike FIG. 2. A plurality of heat emitting units 250a, 250b, . . . , 250n is connected to a long side of the first circuit unit 210, respectively. Widths of the heat emitting units 250a, 250b, . . . , 250n may be uniformly constituted or differently constituted. In order to enhance the heat emitting effect, the heat emitting unit is positioned at a high-temperature portion in the first circuit unit 210 and a width of the heat emitting unit at the high-temperature portion is widely constituted to increase the heat emitting effect. Like FIG. 2, the heat moves in the 290 direction.

Unlike FIG. 2, in FIG. 3, a plurality of heat emitting units is provided. An area of the heat emitting unit 250 of FIG. 2 is smaller than an area of the heat emitting units 250a, 250b, . . . , 250n of FIG. 3. The configuration of FIG. 2 is suitable when the heat is uniformly generated in the first circuit unit 210. The configuration of FIG. 3 is suitable when the heat is generated in a predetermined area of the first circuit unit 210. In the configuration of FIG. 3, the heat emitting units 250a, 250b, . . . , 250n are not connected to each other to prevent the heat of a specific heat emitting unit from being transferred to other heat emitting units. Accordingly, when there is a different in the heat generation of the first circuit unit 210 for each area, the configuration of FIG. 3 maybe applied. In the circuit device 200, I-I' as a cross section of the first circuit unit 210 and the heat emitting unit 250b is the same as the cross section of FIG. 2 and will be described below.

Compared with FIG. 2, when there is a difference in the heat generation according to an interval between the first circuit unit 210 and the hole 250, the plurality of heat emitting units 250a, 250b, . . . , 250n is disposed to separate and emit the heat generated from each hole 250. In this case, the heat does not move to the adjacent area to reduce a possibility that the heat moves between the detailed circuits of the first circuit unit 210 and enhance the heat emitting effect. FIG. 2 or FIG. 3 may be selected and applied according to a path of the heat moving through the patterns of the circuits disposed in the first circuit unit 210 or the light source unit.

Figure 4:
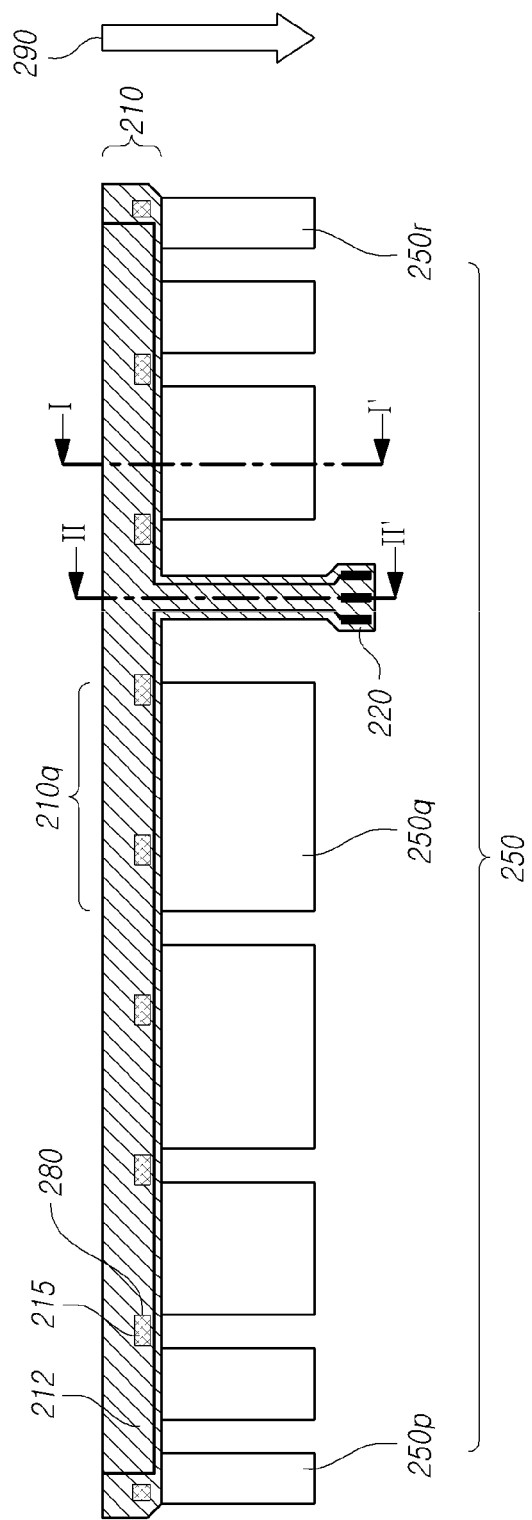
FIG. 4 is a diagram illustrating a configuration of a circuit device connected with a heat emitting unit according to yet another exemplary embodiment of the present invention.

FIG. 4 is a diagram illustrating a configuration of a circuit device connected with a heat emitting unit according to yet another exemplary embodiment of the present invention. A configuration having different widths and areas of heat emitting units 250p, 250q, 250r, . . . , respectively, is proposed.

Among the plurality of heat emitting units, a first heat emitting unit 250q is connected to a first area 210q of the circuit unit 210 and a second heat emitting unit 250p is connected to a second area 210p of the circuit unit 210. Herein, temperatures in the first area 210q and the second area 210p of the circuit unit 210 may be different from each other. That is, since the temperature of the first area 210q is high, the heat emitting unit 250q having a relatively large area maybe disposed. I-I' as a cross section of the first circuit unit 210 and the heat emitting unit 250r is the same as the cross section of FIG. 2 and will be described below.

Like the configuration of FIG. 4, the respective heat emitting units 250p, 250q, 250r, . . . may be constituted to have different widths and areas according to a path of the heat moving through the patterns of the circuits disposed in the first circuit unit 210 or the light source unit. The heat emitting effect may be enhanced by increasing the area of the heat emitting unit in a region where a large amount of heat is generated and decreasing the area of the heat emitting unit in a region where a small amount of heat is generated.

Figure 5:
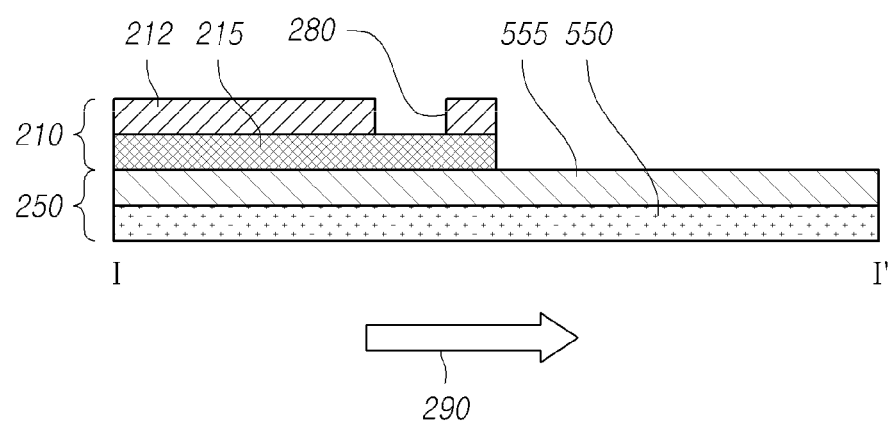
FIG. 5 is a diagram illustrating a cross section of a circuit device according to an exemplary embodiment of the present invention.

FIG. 5 is a diagram illustrating a cross section of a circuit device according to an exemplary embodiment of the present invention. The aforementioned cross section of I-I' of FIGS. 2, 3, and 4 is illustrated.

As shown in FIG. 5, the first circuit unit 210 and the heat emitting unit 250 are connected to each other. The first circuit unit 210 is an element configuring the PCB and the insulating layer 212 and the conductive layer 215 may overlap with each other. For example, the insulating layer 212 may be made of polyimide and the conductive layer 215 may be made of copper (Cu). However, the present invention is not limited to the materials and the first circuit unit 210 may be made of various materials. A part of the insulating layer 212 forms a hole 280 to expose the conductive layer 215. The exposed conductive layer 215 is electrically in contact with the light source unit to apply a signal controlling the light source unit of the backlight unit.

The heat emitting unit 250 is made of an effective heat emitting material. The heat emitting unit 250 of FIG. 5 is constituted by a double layer, but is constituted by a multilayer or a single layer as an exemplary embodiment. In FIG. 5, the heat emitting unit 250 may be made of a metal material having a high heat emitting effect as a second layer 550. In this case, an insulating layer 555 for insulation between the metal material and the conductive layer 215 of the first circuit unit 210 is included. Of course, the heat emitting unit 250 is made of a non-conductive material to be constituted by a single layer. The multilayer is a structure where the insulating layer 555 is illustrated at a portion designated with 250 in FIGS. 2, 3, and 4.

In FIG. 5, the heat emitting unit 250 emits the heat of the contacted first circuit unit 210 in the 290 direction. In FIG. 5, the heat emitting unit 250 may be a configuration covering the outside of the light source unit. That is, in order to enhance the heat emitting effect, when the area of the heat emitting unit 250 is increased, the heat emitting unit 250 is positioned at the outside of the light source unit to save a space.

When the heat emitting unit 250 is constituted by two layers 550 and 555 and one layer 550 is made of a metal layer as an exemplary embodiment, the heat emitting unit 250 may provide a function of supporting the circuit device and a heat emitting function together. The heat emitting function and the supporting function are divided into the two layers 550 and 555 to remove the mold of FIG. 1 and reduce a size of the backlight unit, and as a result, the size of the bezel of the display device may be reduced.

Figure 6:
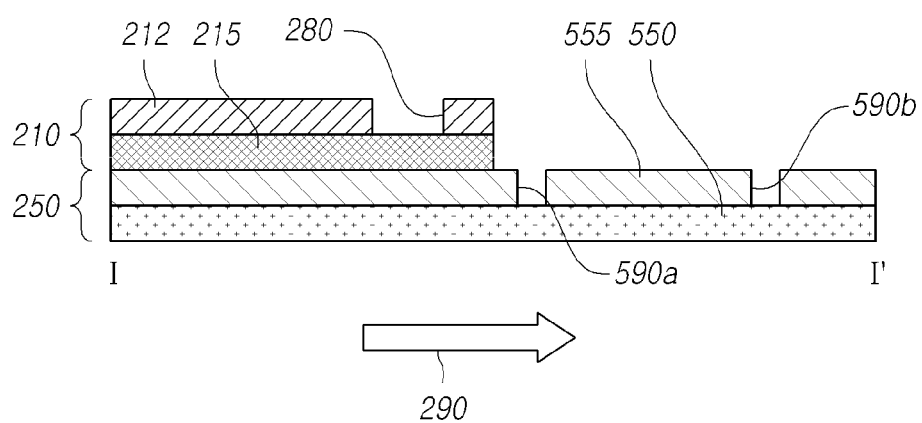
FIG. 6 is a diagram illustrating a cross section of a circuit device according to another exemplary embodiment of the present invention.

FIG. 6 is a diagram illustrating a cross section of a circuit device according to another exemplary embodiment of the present invention. A configuration in which a heat emitting unit is constituted by a multilayer, the insulating layer 555 is isolated so that a part of the heat emitting unit easily covers the outside of the light source unit, and holes 590a and 590b are disposed is illustrated.

Figure 7:
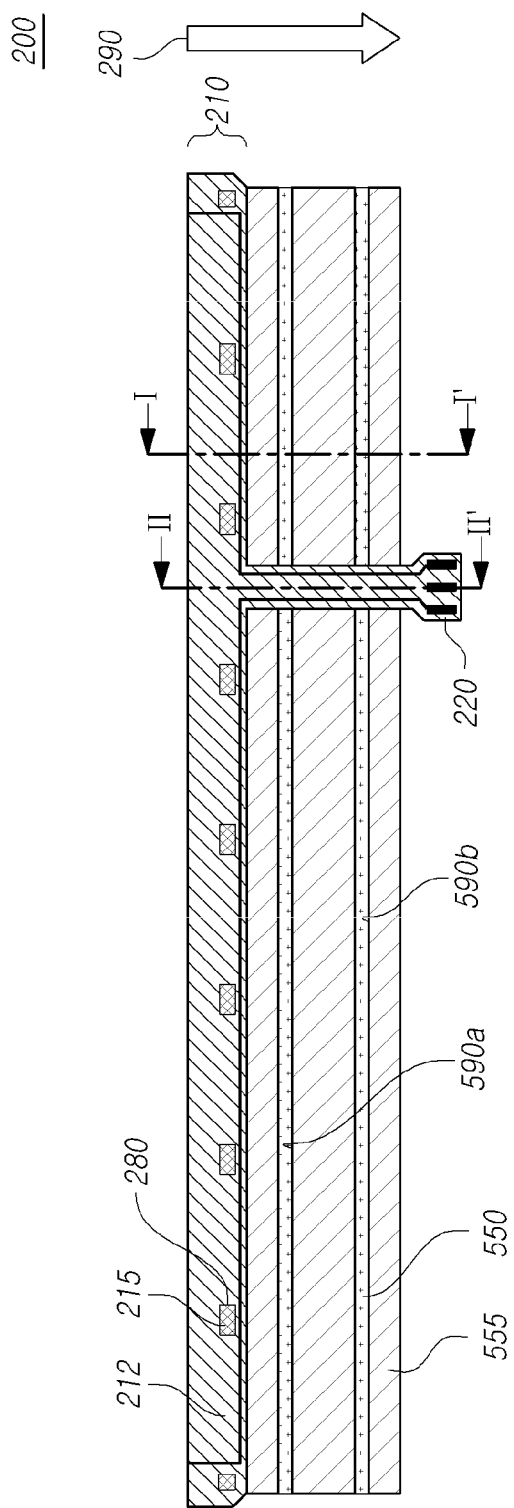
FIG. 7 is a plan view of an overall circuit device when an insulating layer is isolated as illustrated in FIG. 6.

FIG. 7 is a plan view of an overall circuit device when the insulating layer 555 is isolated as illustrated in FIG. 6. The second layer 550 is exposed through the holes 590a and 590b. However, since the second circuit unit 220 has a conductive layer, the insulating layer 550 is disposed under the second circuit unit 220, or a separate heat emitting unit may not be included under the second circuit unit 220. In the configuration of FIGS. 6 and 7, the insulating layer is discontinuously disposed to allow the double-layered heat emitting unit to easily cover the light source unit. The heat emitting unit covers the light source unit to emit the heat generated from the light source unit to the outside. Further, since the insulating layer is discontinuously disposed, the heat emitting unit is curved well and the circuit device 200 may be connected with the light source unit in close contact with the cover bottom.

Figure 8:
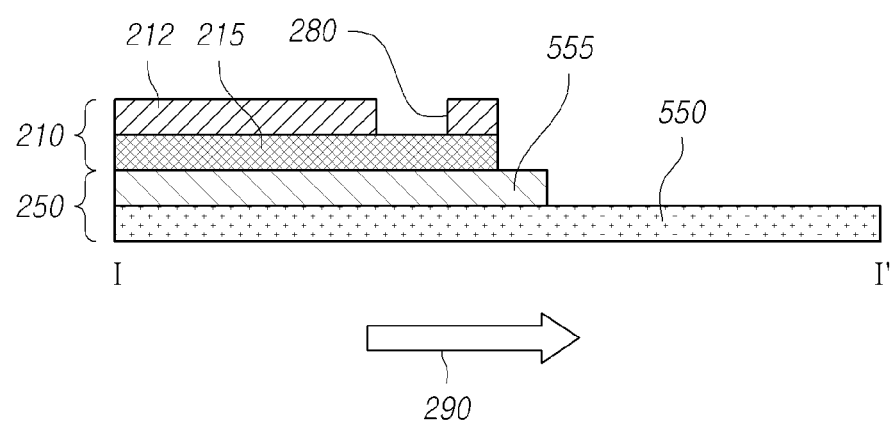
FIG. 8 is a diagram illustrating only a part of the insulating layer in FIG. 6.

FIG. 8 is a diagram illustrating only a part of the insulating layer 555 in FIG. 6. In FIG. 8, in order to reduce a thickness due to the insulating layer 555, the insulating layer 555 is disposed only at a portion which is electrically insulated from the first circuit unit 210. Since the configuration of FIG. 8 reduces the thickness of the entire heat emitting unit 250, both the size of the backlight unit and the size of the bezel may be reduced. This maybe applied to a case where the heat emitting unit 250 includes a metal layer having high thermal conductivity.

Figure 9:
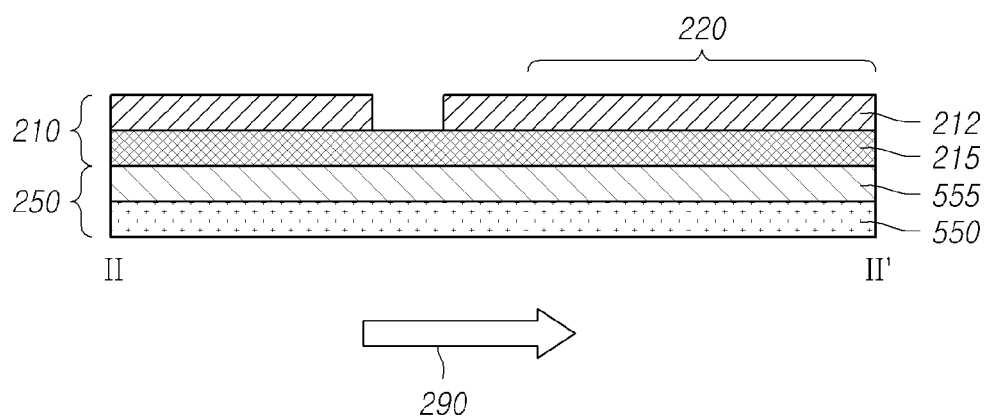
FIG. 9 is a diagram illustrating cross sections of a first circuit unit and a second circuit unit in the circuit device of FIGS. 2 and 7.

FIG. 9 is a diagram illustrating cross sections of the first circuit unit 210 and the second circuit unit 220 in the circuit device 200 of FIGS. 2 and 7 described above. Since the second circuit unit 220 is disposed, a case where the heat emitting unit is disposed is illustrated.

Figure 10:
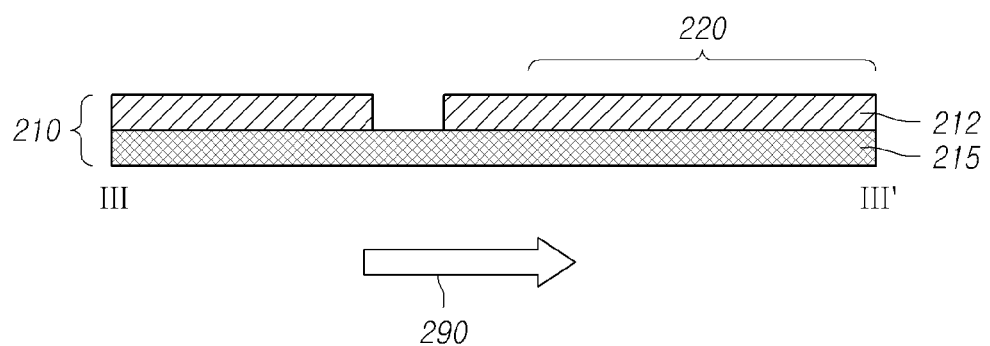
FIG. 10 is a diagram illustrating cross sections of a first circuit unit and a second circuit unit in the circuit device of FIGS. 3 and 4.

FIG. 10 is a diagram illustrating cross sections of the first circuit unit 210 and the second circuit unit 220 in the circuit device 200 of FIGS. 3 and 4 described above. Since the second circuit unit 220 is disposed, a case where the heat emitting unit is not disposed is illustrated.

Figure 11:
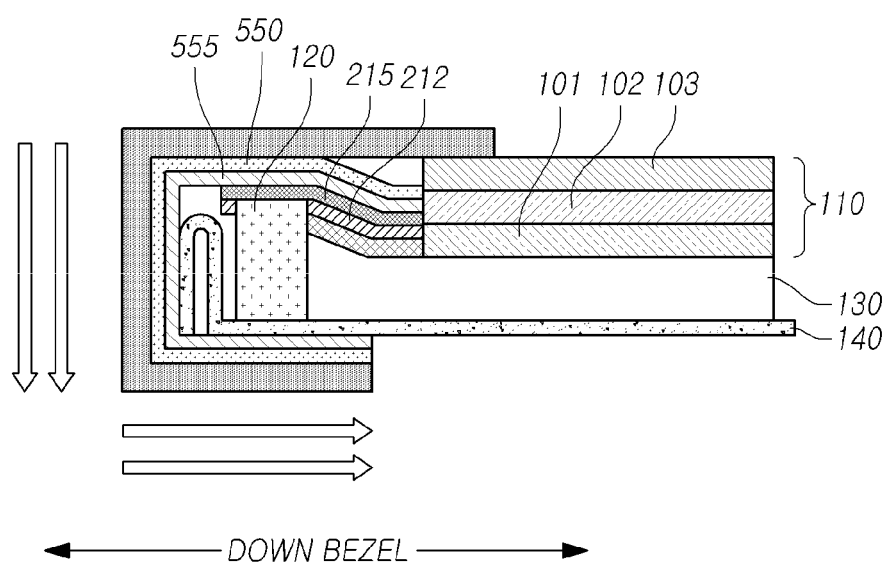
FIG. 11 is a diagram illustrating a configuration of a backlight unit including the circuit device according to the exemplary embodiment of the present invention.

FIG. 11 is a diagram illustrating a configuration of a backlight unit including the circuit device according to the exemplary embodiment of the present invention.

The conductive layer 215 and the light source unit 120 of the circuit device are electrically in contact with each other in the aforementioned hole 280. The heat emitting unit 250 is disposed at the outside of the light source unit 120 to emit the heat, and further, the second layer 550 of the heat emitting unit 250 fixes the circuit device 200. As a result, the size of the down bezel may be reduced by removing the mold unit 150 described in FIG. 1.

In the aforementioned circuit device 200, the heat emitting effect of the heat emitting unit 250 is proportional to the area of the heat emitting unit 250. Meanwhile, when the area of the heat emitting unit 250 is increased, the area occupied by the circuit device 200 may be increased. In the case where the second layer 550 of the heat emitting unit 250 is made of a material such as metal when the present invention is applied, the circuit device 200 may be fixed by removing the mold unit 150 from the configuration of FIG. 1 to have the heat emitting effect and the bezel reduction effect.

Figure 12:
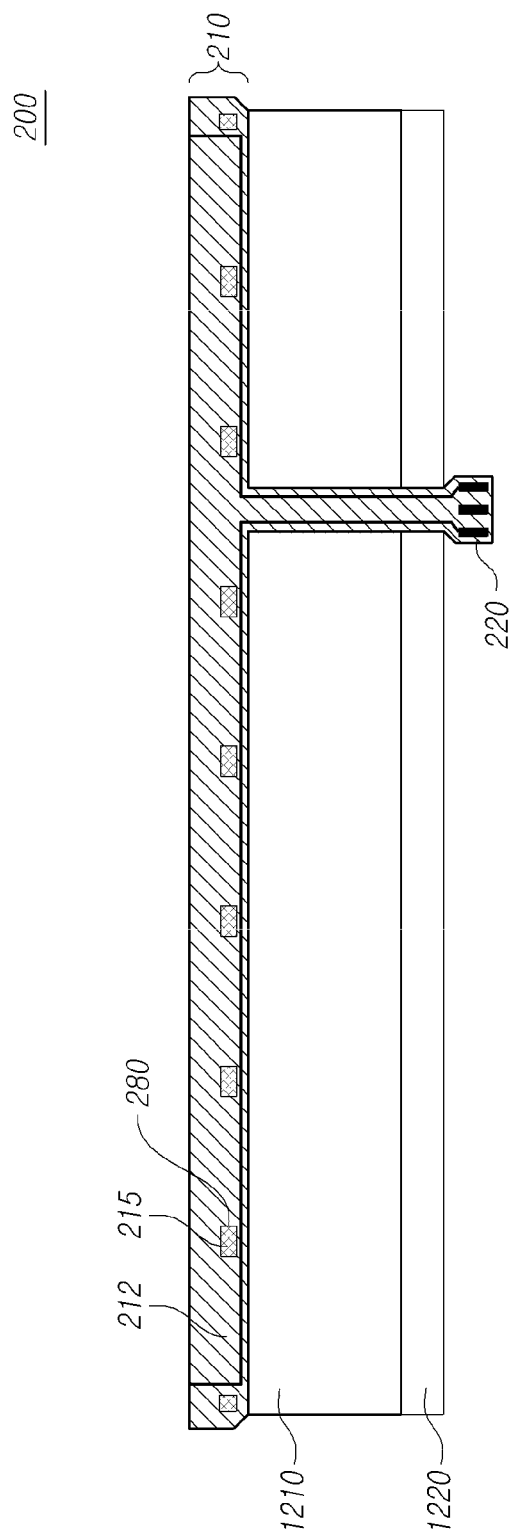
FIG. 12 is a diagram illustrating a circuit device according to yet another exemplary embodiment of the present invention.

FIG. 12 is a diagram illustrating a circuit device according to yet another exemplary embodiment of the present invention.

Heat emitting units connected to the circuit device are constituted by two types. The heat emitting units are constituted by a first heat emitting unit 1210 and a second heat emitting unit 1220, and the first heat emitting unit 1210 is connected to the first circuit unit 210 of the circuit device and the second heat emitting unit 1220 is connected to the first heat emitting unit 1210. The first heat emitting unit 1210 and the second heat emitting unit 1220 have a difference in a thickness, a material, and the like. The first heat emitting unit 1210 and the second heat emitting unit 1220 enhance the heat emitting effect while supporting the circuit device 200 in the backlight unit. The first heat emitting unit 1210 may provide both the functions of emitting the heat and supporting the circuit device 200 and the second heat emitting unit 1220 may provide the heat emitting function. To this end, the circuit device 200 may be constituted so that the heat emitting effect of the second heat emitting unit 1220 is higher than that of the first heat emitting unit 1210, and as an exemplary embodiment, when the second heat emitting unit 1220 is made of a graphene or graphite material, the heat emitting effect may be enhanced. The insulating layer may be disposed among the first heat emitting unit 1210, the first circuit unit 212, and the second circuit unit 220.

Figure 13:
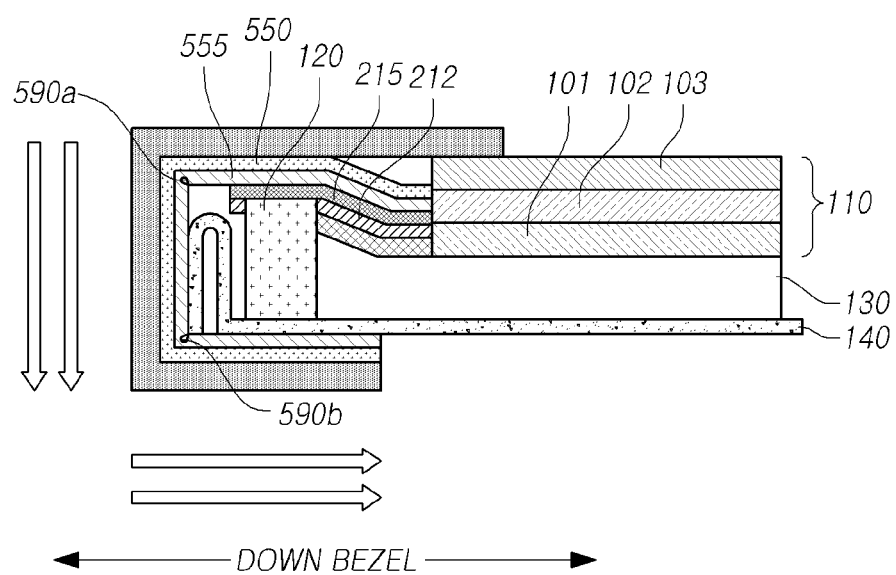
FIG. 13 is a diagram illustrating a configuration of a backlight unit including the circuit device according to another exemplary embodiment of the present invention.

FIG. 13 is a diagram illustrating a configuration of a backlight unit including the circuit device according to another exemplary embodiment of the present invention. The circuit device described in FIG. 6 is constituted to cover the light source unit 120. The holes 590a and 590b described above are portions curved for covering the light source unit 120, respectively.

Figure 14:
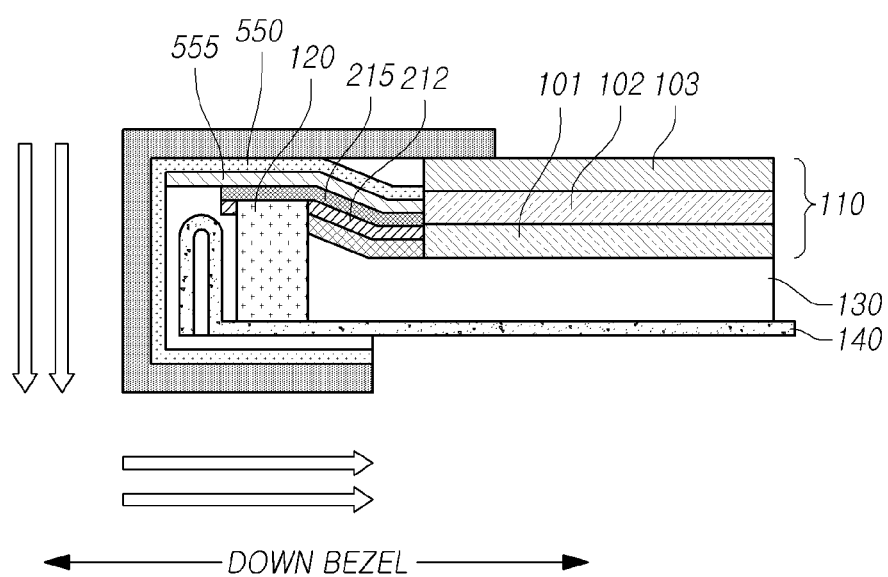
FIG. 14 is a diagram illustrating a configuration of a backlight unit including the circuit device according to another exemplary embodiment of the present invention.

FIG. 14 is a diagram illustrating a configuration of a backlight unit including the circuit device according to another exemplary embodiment of the present invention. The circuit device described in FIG. 8 is constituted to cover the light source unit 120. As described above, the second layer 550 of the heat emitting unit is expanded and disposed to emit the heat and support the circuit device 200.

Figure 15:
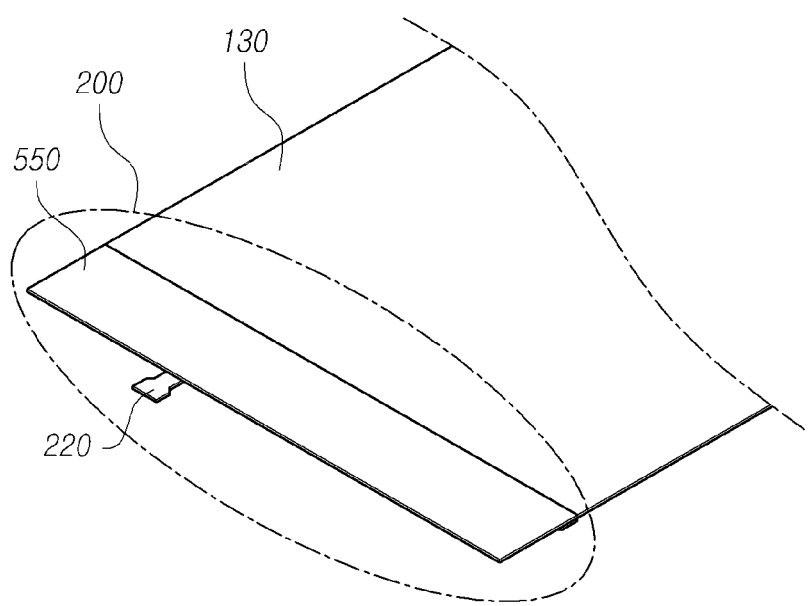
FIG. 15 is a diagram illustrating a configuration of a backlight unit according to an exemplary embodiment of the present invention.

FIG. 15 is a diagram illustrating a configuration of a backlight unit according to an exemplary embodiment of the present invention. The aforementioned circuit device of FIG. 2 is a configuration connected to the light guide plate 130 and a configuration in which the circuit device of FIG. 2 is viewed from the bottom.

Figure 16:
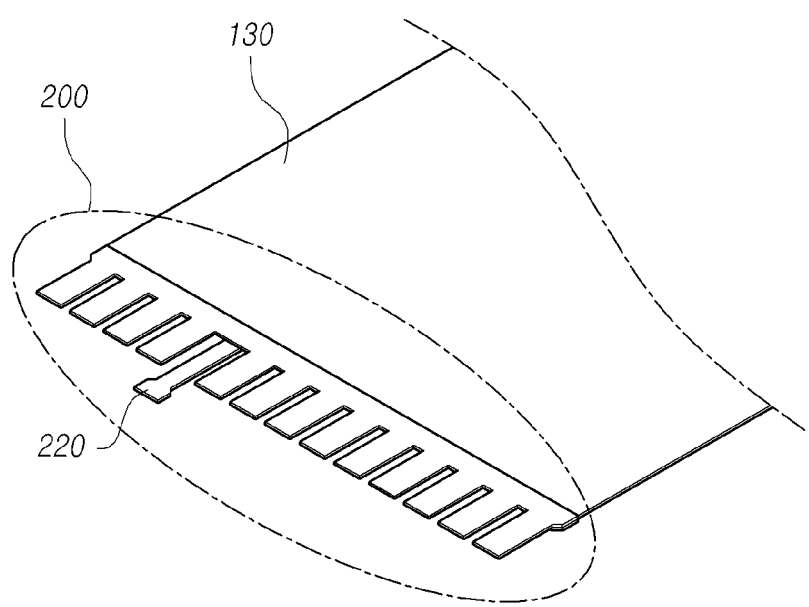
FIG. 16 is a diagram illustrating a configuration of a backlight unit according to another exemplary embodiment of the present invention.

FIG. 16 is a diagram illustrating a configuration of a backlight unit according to another exemplary embodiment of the present invention. The aforementioned circuit device of FIG. 3 is a configuration connected to the light guide plate 130 and a configuration in which the circuit device of FIG. 3 is viewed from the bottom.

In summary, the embodiments of the present invention can include the circuit device that includes the first circuit unit electrically connected to the light source unit, the second circuit unit receiving the control signal controlling the light source unit, and the heat emitting unit connected to one side of the first circuit unit to cover the outside of the light source unit.

Further, the embodiments of the present invention can include the backlight unit that includes the light source unit including the plurality of light sources, the light guide plate reflecting the light of the light source to the liquid crystal display panel, and the circuit device including the first circuit unit electrically connected to the light source unit, the second circuit unit receiving the control signal controlling the light source unit, and the heat emitting unit connected to one side of the first circuit unit to cover the outside of the light source unit.

It will be appreciated that technical spirit of the present invention have been described herein for purposes of illustration by the above description and the accompanying drawings, and that combination, separation, substitution, and modifications of components maybe made by those skilled in the art without departing from the scope and spirit of the present invention. Therefore, the exemplary embodiments of the present invention are provided for illustrative purposes only but not intended to limit the technical concept of the present invention. The scope of the technical concept of the present invention is not limited thereto. The protective scope of the present invention should be construed based on the following claims, and all the technical concepts in the equivalent scope thereof should be construed as falling within the scope of the present invention.

What is claimed is:

1. A circuit device, comprising:
a first circuit unit configured to electrically connect to a light source unit, the first circuit unit having a long side extending in a first direction;
a second circuit unit configured to receive a control signal for controlling the light source unit, the second circuit unit having a long side extending in a second direction perpendicular to the first direction; and
at least one heat emitting unit connected to one side of the first circuit unit to cover the outside of the light source unit,
wherein the first circuit unit and the second circuit unit are directly in contact with the at least one heat emitting unit,
wherein the circuit device is disposed in a backlight unit,
wherein the first circuit unit and the second circuit unit include a common electrically conductive layer directly on the at least one heat emitting layer so that the first circuit unit and the second circuit unit are coplanar and in contact with each other,
wherein the first circuit unit and the second circuit unit further include respective insulating layers, and the respective insulating layers are directly on one side of the common electrically conductive layer,
wherein the second circuit unit extends away from the first circuit unit from a contact portion at which the first and second circuit units are directly in contact with each other, and
wherein the first circuit unit overlaps at least a part of the at least one heat emitting unit in a plan view such that one end of the first circuit unit and one end of the at least one heat emitting unit are in exact alignment.

2. The circuit device of claim 1, wherein the at least one heat emitting unit is integrally connected to the long side of the first circuit unit.

3. The circuit device of claim 1, wherein the at least one heat emitting unit includes a plurality of heat emitting units, and
the plurality of heat emitting units are connected to the long side of the first circuit unit and widths of the heat emitting units are the same as each other.

4. The circuit device of claim 1, wherein the at least one heat emitting unit includes a plurality of heat emitting units, and
the plurality of heat emitting units are connected to the long side of the first circuit unit and widths of the heat emitting units are different from each other.

5. The circuit device of claim 4, wherein the plurality of heat emitting units includes first and second heat emitting units,
the width of the first heat emitting unit is larger than that of the second heat emitting unit, and
a first region of the first circuit unit to which the first heat emitting unit is connected has a higher temperature than a second region of the first circuit unit to which the second heat emitting unit is connected.

6. The circuit device of claim 1, wherein the at least one heat emitting unit includes:
an insulating layer which is directly in contact with the first circuit unit; and
a metal layer which is in contact with the insulating layer and insulated from the first circuit unit.

7. The circuit device of claim 6, wherein the insulating layer is discontinuously disposed in a parallel direction to the long side of the first circuit unit.

8. The circuit device of claim 6, wherein the insulating layer is disposed in a region where the metal layer overlaps with the first circuit unit and the second circuit unit.

9. The circuit device of claim 1, wherein the at least one heat emitting unit includes a first heat emitting unit and a second heat emitting unit,
a first surface of the first heat emitting unit is integrally connected to the long side of the first circuit unit, and
a first surface of the second heat emitting unit is connected to a second surface parallel to the first surface of the first heat emitting unit.

10. The circuit device of claim 9, wherein the second heat emitting unit includes a graphene or graphite material.

11. The circuit device of claim 1,
wherein a first portion of the common electrically conductive layer included in the first circuit unit and a second portion of the common electrically conductive layer included in the second circuit unit are coplanar.

12. A backlight unit, comprising:
a light source unit including a plurality of light sources;
a light guide plate reflecting light of at least one of the light sources to a liquid crystal display panel; and
a circuit device including a first circuit unit electrically connected to the light source unit and the first circuit unit having a long side extending in a first direction, a second circuit unit receiving a control signal controlling the light source unit and the second circuit unit having a long side extending in a second direction perpendicular to the first direction, and at least one heat emitting unit connected to one side of the first circuit unit to cover the outside of the light source unit,
wherein the first circuit unit and the second circuit unit are directly in contact with an upper surface of the at least one heat emitting unit,
wherein the first circuit unit and the second circuit unit include a common electrically conductive layer directly on the at least one heat emitting unit so that the first circuit unit and the second circuit unit are coplanar and in contact with each other,
wherein the first circuit unit and the second circuit unit further include respective insulating layers, and the respective insulating layers are directly on one side of the common electrically conductive layer,
wherein the second circuit unit extends away from the first circuit unit from a contact portion at which the first and second circuit units are directly in contact with each other, and
wherein the first circuit unit overlaps at least a part of the at least one heat emitting unit in a plan view such that one end of the first circuit unit and one end of the at least one heat emitting unit are in exact alignment.

13. The backlight unit of claim 12, wherein the at least one heat emitting unit includes a plurality of heat emitting units, and
one or more heat emitting units are connected to the long side of the first circuit unit.

14. The backlight unit of claim 12, wherein the at least one heat emitting unit of the circuit device includes an insulating layer which is directly in contact with the first circuit unit and a metal layer which is in contact with the insulating layer and insulated from the first circuit unit.

15. The backlight unit of claim 14, wherein the insulating layer is discontinuously disposed in a parallel direction to the long side of the first circuit unit, and a region without the insulating layer and an edge region of the light source unit are in contact with each other.

16. The backlight unit of claim 14, wherein the insulating layer is disposed in a region where the metal layer overlaps with the first circuit unit and the second circuit unit.

17. The backlight unit of claim 12, wherein the at least one heat emitting unit includes a first heat emitting unit and a second heat emitting unit,
a first surface of the first heat emitting unit is integrally connected to the long side of the first circuit unit, and
a first surface of the second heat emitting unit is connected to a second surface parallel to the first surface of the first heat emitting unit.

18. The backlight unit of claim 17, wherein the second heat emitting unit includes a graphene or graphite material.

19. The backlight unit of claim 12,
wherein a first portion of the common electrically conductive layer included in the first circuit unit and a second portion of the common electrically conductive layer included in the second circuit unit are coplanar.

* * * * *